US006235139B1

(12) United States Patent
Vichinsky, Jr. et al.

(10) Patent No.: US 6,235,139 B1
(45) Date of Patent: May 22, 2001

(54) PRESSURE SEAL FORM PRODUCTION

(75) Inventors: John J. Vichinsky, Jr., Southfield, MI (US); Wayne Peterson, Manchester, NH (US); Will Hutchinson, St. George, UT (US)

(73) Assignee: Moore U.S.A., Inc., Grand Island, NY (US)

( * ) Notice: Subject to any disclaimer, the term of this patent is extended or adjusted under 35 U.S.C. 154(b) by 0 days.

(21) Appl. No.: 09/112,355

(22) Filed: Jul. 9, 1998

(51) Int. Cl.[7] .............................. B32B 31/20

(52) U.S. Cl. .............................. 156/219; 229/92.1; 229/92.3; 156/227; 156/277; 156/290; 156/293; 156/298

(58) Field of Search .............................. 156/219, 227, 156/277, 290, 293, 298; 229/92.1, 92.3

(56) References Cited

U.S. PATENT DOCUMENTS

| | | | | |
|---|---|---|---|---|
| 4,447,481 | | 5/1984 | Holmberg | 428/40.1 |
| 4,618,520 | | 10/1986 | Holmberg | 428/131 |
| 4,918,128 | | 4/1990 | Sakai | 524/450 |
| 5,076,490 | * | 12/1991 | Dulin | 229/92.8 |
| 5,201,464 | * | 4/1993 | File | 229/305 |
| 5,253,798 | | 10/1993 | Lombardo | 229/92.1 |
| 5,314,110 | | 5/1994 | Lombardo | 229/92.1 |
| 5,320,387 | | 6/1994 | Carlson | 283/75 |
| 5,378,303 | * | 1/1995 | Traise | 156/555 |
| 5,413,830 | | 5/1995 | Edwards | 428/40.1 |
| 5,604,006 | | 2/1997 | Ponchaud | 428/67 |
| 5,697,496 | * | 12/1997 | Bauer | 206/308.1 |
| 5,705,243 | * | 1/1998 | Mehta | 229/92.1 |

OTHER PUBLICATIONS

"LaserWell" and "WindoWell" Internet information from FormStore Incorporated, Dec., 1997.

* cited by examiner

*Primary Examiner*—Nasser Ahmad
(74) *Attorney, Agent, or Firm*—Nixon & Vanderhye P.C.

(57) ABSTRACT

A mailer type business form is constructed from an intermediate having a plurality of pressure activated cohesive cooperating patterns, and a card is mounted on or with the intermediate. Despite the fact that a card is included, because of the provision of surface manifestations in the intermediate, and/or because of the relative thicknesses of the card and the intermediate, the mailer may be sealed by steam rolling rather than requiring selective edge sealing. A surface manifestation may comprise a cutout with a patch, or a folded over portion of the intermediate, retaining the card with the intermediate during processing. Alternatively, first and second thinned portions of the sheet of paper, disposed on opposite sides of a fold line so as to cooperate and hold the card when the sheet is folded about the fold line, may be provided, the thinned portions provided by embossing, for example. The card typically has a thickness substantially equal to or less than that of the intermediate; for example, the card may have a thickness of about 7 mil, while the sheet of paper forming the intermediate is 38 pound ledger paper, which also has a thickness of about 7 mil.

20 Claims, 3 Drawing Sheets

PRESSURE SEAL FORM PRODUCTION

BACKGROUND AND SUMMARY OF THE INVENTION

The use of pressure activated cohesive has revolutionized the mailer type business form industry. Pressure activated cohesive forms, such as sold by Moore U.S.A., Inc. of Lake Forest, Ill. under the trademark SPEEDISEALER, have numerous advantages over conventional mailer systems. However, despite these numerous advantages, there is a drawback in using the pressure activated cohesive sealing system when the mailer has an insert, such as a card, such as the increasingly popular club cards, phone cards, debit cards, and the like. When such an insert is used it is necessary to seal the form with edge sealing equipment, such as shown in U.S. Pat. Nos. 5,133,828 and 5,169,489. While such equipment is very effective, for some applications it is more effective if a simple conventional steam roller sealer is utilized, which comprises a pair of rolls which apply a sealing pressure of at least 100 pounds per linear inch to the entire mailer rather than just to portions thereof where pressure activated cohesive is likely to be. A steam roller sealer is also very simple, and does not require the movement of the mailer in two transverse directions, but rather all sealing is done in the one pass with unidirectional movement.

According to the present invention, it is possible to use steam-roll sealing with mailer type business forms having pressure activated cohesive while at the same time having an insert, such as a card. This is accomplished by providing particular surface manifestations in a business form intermediate which receive the card, and by dimensioning the relative thicknesses between the card and the business form intermediate in particular ways.

According to one aspect of the present invention, a method of forming a mailer type business form from an intermediate having a plurality of pressure activated cohesive cooperating patterns and a first thickness, and a card having a second thickness substantially the same as or less than the first thickness, is provided. The method comprises the following: (a) Forming a surface manifestation in at least one portion of the intermediate having length and width dimensions at least as great as length and width dimensions of the card. (b) Placing the card in operative association with the surface manifestation. (c) Folding the intermediate to form an unsealed mailer with the pressure activated cohesive patterns in operative association with each other. And (d) steam-roll sealing the unsealed mailer to cause the pressure activated cohesive patterns to seal, to form a final mailer.

(a) may be practiced by forming a cutout as the surface manifestation. The method may further comprise placing a patch having a thickness less than one-fourth the thickness of the intermediate over the cutout to prevent the card from passing through the cutout during subsequent handling; or the method may further comprise forming a first fold in the intermediate covering the cutout to prevent the card from passing through the cutout during subsequent handling. The method also typically further comprises imaging at least one of the card and the intermediate (preferably both) after (b) and before (c). The method may be practiced with the forms in continuous web, or cut sheet, formats.

Alternatively, (a) may be practiced by reducing the thickness of the intermediate (such as by embossing) at two portions thereof that are aligned with each other after the practice of (c), and (b) is practiced by placing the card in contact with one of the reduced thickness portions. Again, the method may further comprise imaging at least one of the card and the intermediate after (b) and before (c).

Typically (a) through (d) are practiced using a card having substantially the same thickness as the intermediate; for example, (a) through (d) may be practiced using a card about 7 mil thick and 38 pound ledger paper as the intermediate.

According to another aspect of the present invention a business form intermediate is provided comprising the following components: A substantially quadrate sheet of paper having first and second faces and having a first thickness, first length and width dimensions, and having at least a first fold line. A card having a second thickness substantially equal to or less than the thickness of the first thickness, and second length and width dimensions less than half the length and width dimensions of the sheet of paper. A plurality of patterns of pressure activated cohesive formed on the first face, for cooperation with each other when the sheet of paper is folded about the first fold line. At least one surface manifestation formed in the sheet of paper having length and width dimensions substantially equal to or greater than the second length and width dimensions. The card disposed in operative association with at least one surface manifestation. And the at least one surface manifestation constructed so that when the sheet of paper is folded about the first fold line with the card received by the at least one surface manifestation, the intermediate has uniform enough thickness to be properly pressure sealed by a steam-roller sealer.

The at least one surface manifestation may comprise a cutout, and the intermediate may further comprise a patch, having a thickness less than one-fourth of the first thickness, covering the cutout. Alternatively, the sheet of paper may have a second fold line substantially parallel to the first fold line, and the sheet of paper may be folded about that second fold line prior to folding about the first fold line in order to maintain the card within the cutout.

Alternatively, the at least one surface manifestation comprises first and second thinned portions of the sheet of paper disposed on opposite sides of the first fold line so as to cooperate, and hold the card therein, when the sheet of paper is folded about the first fold line.

Desirably the first and second thicknesses are substantially the same, such as the card having a thickness of about 7 mils and the sheet of paper being 38 pound ledger paper (i.e. 38 pounds per 1000 sheet 11×17 inch ream).

According to another aspect of the present invention a business form intermediate is provided comprising the following components: A substantially quadrate sheet of paper having first and second faces and having a first thickness, first length and width dimensions, and having at least a first fold line. A card having a second thickness greater than the thickness of the first thickness, and second and length and width dimensions less than half the length and width dimensions of the sheet of paper. A plurality of patterns of pressure activated cohesive formed on the first face, for cooperation with each other when the sheet of paper is folded about the first fold line. At least two surface manifestations formed on the sheet of paper on opposite sides of the first fold line and having length and width dimensions substantially equal to or greater than the second length and width dimensions. The card disposed in operative association with one of the surface manifestations. And the surface manifestations constructed so that when the sheet of paper is folded about the first fold line with the card received by the one of the surface manifestations the intermediate has uniform enough thickness to be properly pressure sealed by a steam-roller sealer wherein both said first and second surface manifestations comprise cutouts, and further comprising a patch having a thickness less than one-fourth said first thickness covering each of said cutouts.

It is the primary object of the present invention to provide a method of forming a mailer type business form, and providing an intermediate for forming the mailer type business form, which allow the business form to have an insert yet be sealed with a conventional steam-roll sealer. This and other objects of the invention will become clear from an inspection of the detailed description of the invention and from the appended claims.

DETAILED DESCRIPTION OF THE DRAWINGS

Figure 1:
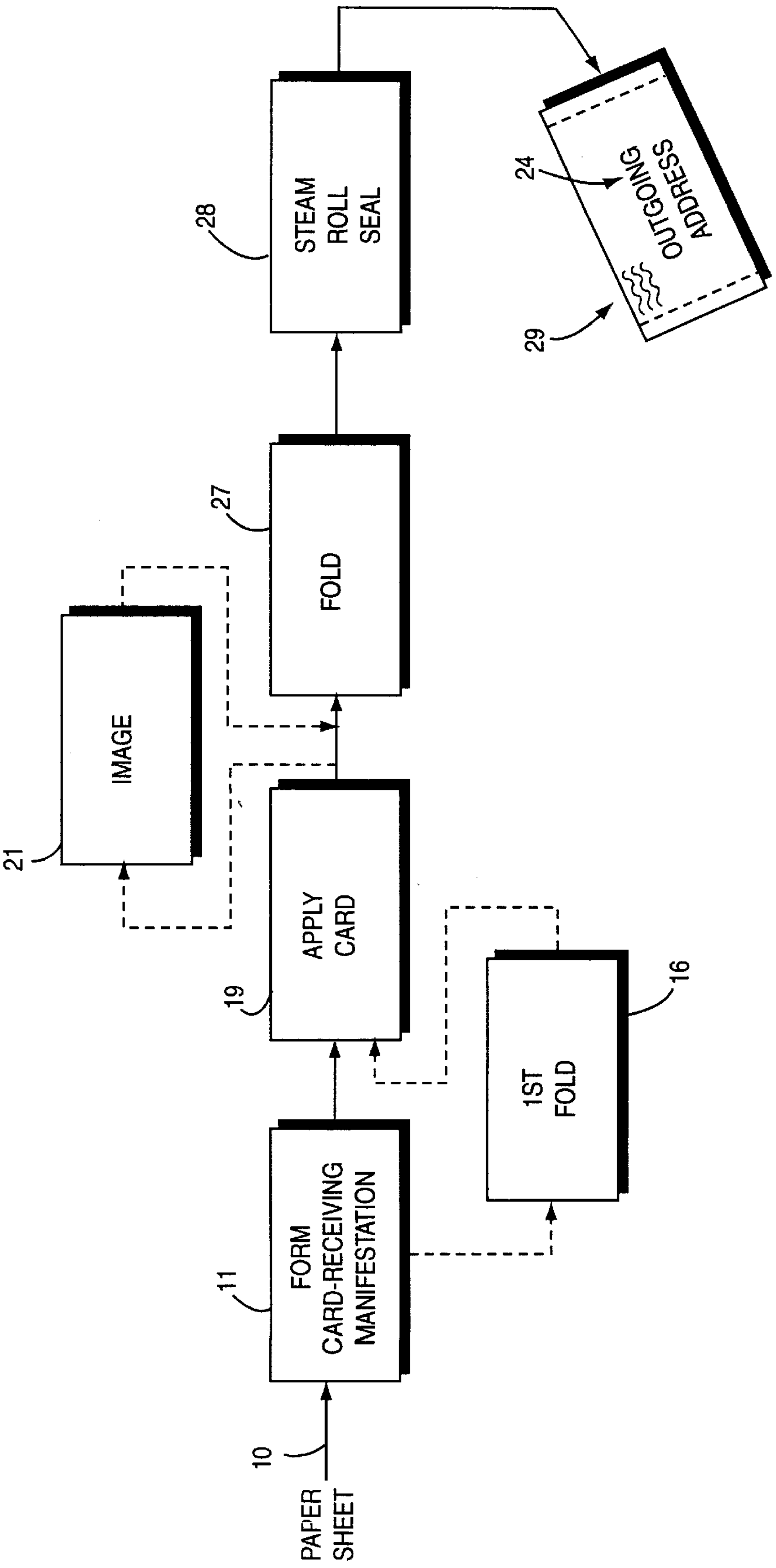
FIG. 1 is a schematic box diagram indicating the steps in the practice of the exemplary method according to the present invention.
Figure 3:
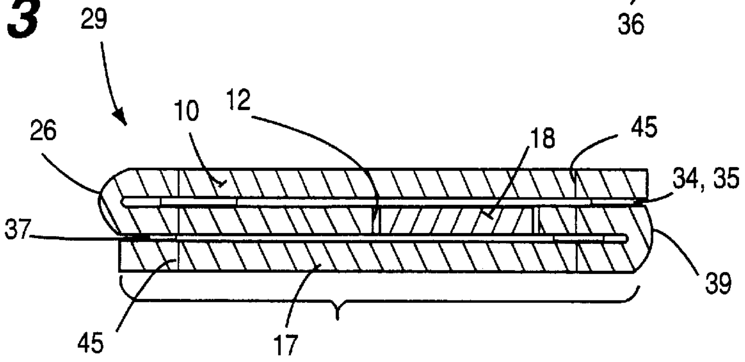
FIG. 3 is a side schematic cross-sectional view of the structure FIG. 2 when folded into a mailer type business form and sealed.
Figure 4:
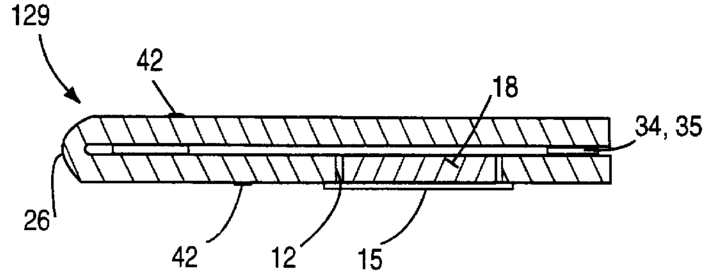
FIG. 4 is a view like that of FIG. 3 only showing a second embodiment of the mailer according to the invention.

FIG. 1 schematically illustrates a method of forming a mailer type business form according to the present invention. A paper sheet 10, which forms the intermediate and which has a plurality of cooperating pressure activated cohesive patterns (such as strips) has at least one card-receiving manifestation formed therein as indicated at box 11. For example, the card-receiving manifestation may be a cutout, such as seen at 12 in FIG. 2, formed by conventional die cutting from the sheet of paper 10 which forms the intermediate, or step 11 may be practiced by forming reduced thickness portions 14 in the paper 10 (such as by embossing using conventional embossing equipment) as illustrated in FIG. 5.

Where the cutout 12 is not covered by a patch, such as the patch 15 in FIG. 4, there may be the step 16 of folding over the sheet of paper 10 to provide a folded over portion 17 (see FIG. 3), either the patch 15 or the folded over portion 17 holding the card 18 in place during subsequent handling. In any event, regardless of the exact nature of steps 11, 16, ultimately the card 18 is applied to the intermediate 10, as schematically illustrated at 19 in FIG. 1. Card application at 19 may be by any suitable conventional technique, such as "tip on", static cling (depending the material of the card 18), mating a web of cards 18 with a surface manifestation 12, 14, and/or utilizing adhesive- such as shown schematically at 20 in FIG. 5- to hold the card 18 in place. Step 19 even may be practiced manually.

While virtually all imaging may be accomplished before step 19 of FIG. 1, under many circumstances it is desirable to image at least one of the card 18 and intermediate 10 after the card 18 has been associated with the intermediate 10, as indicated schematically by box 21 in FIG. 1. The imaging 21 may be accomplished utilizing any conventional imaging equipment, such as a laser printer, impact printer, ink jet printer, etc. Oftentimes it will be desirable to image common indicia on the intermediate 10 and the card 18- as indicated by the indicia 22, 23 at FIG. 2 which are such common indicia (such as the recipient's name)- and additionally it is oftentimes desirable to image outgoing address indicia 24 perhaps on the card 18, but more often on the intermediate 10, the outgoing address indicia 24 typically having at least some elements in common with some of the indicia 22, 23. Of course, other indicia- such as seen at 25 in FIG. 2- may be applied earlier, or at the same time, and not be common to the intermediate 10 and the card 18.

Figure 2:
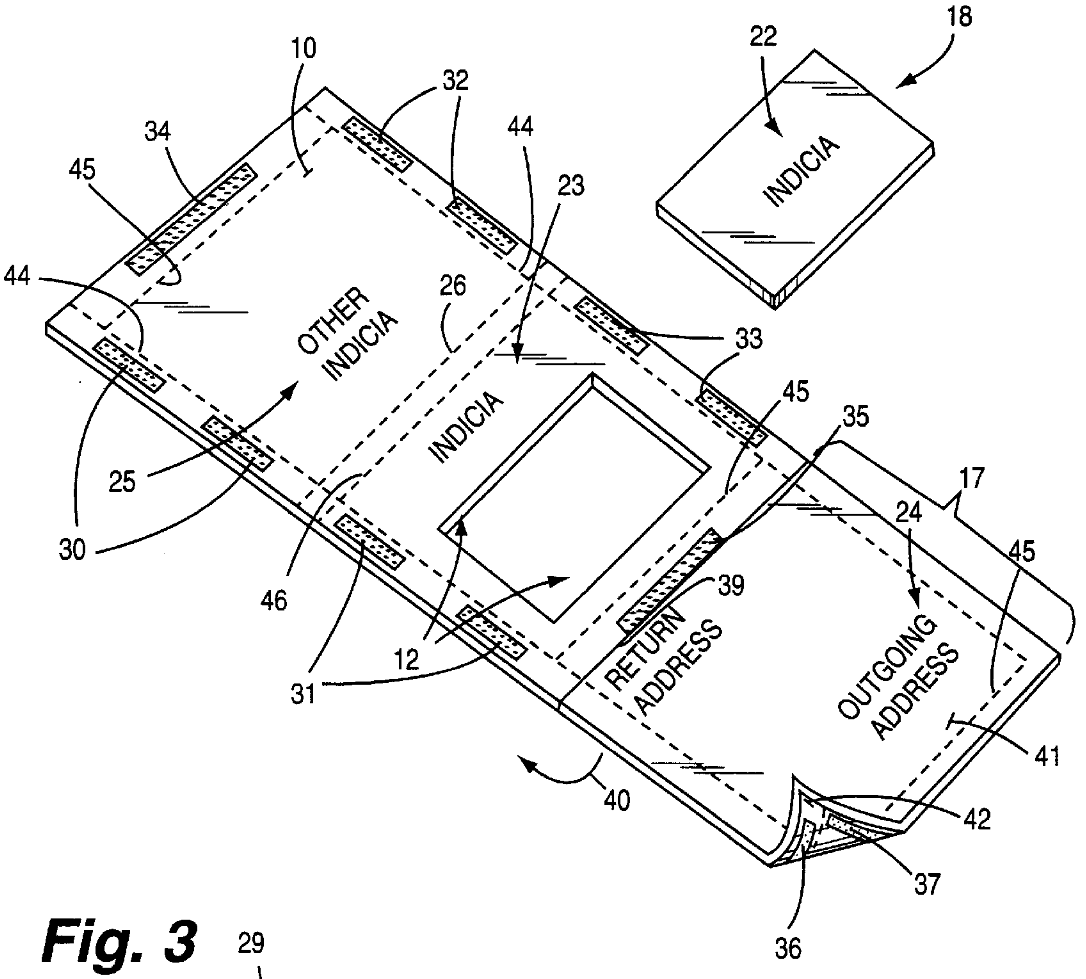
FIG. 2 is top schematic perspective view of an exemplary business form intermediate and associated card according to the present invention.
Figure 5:
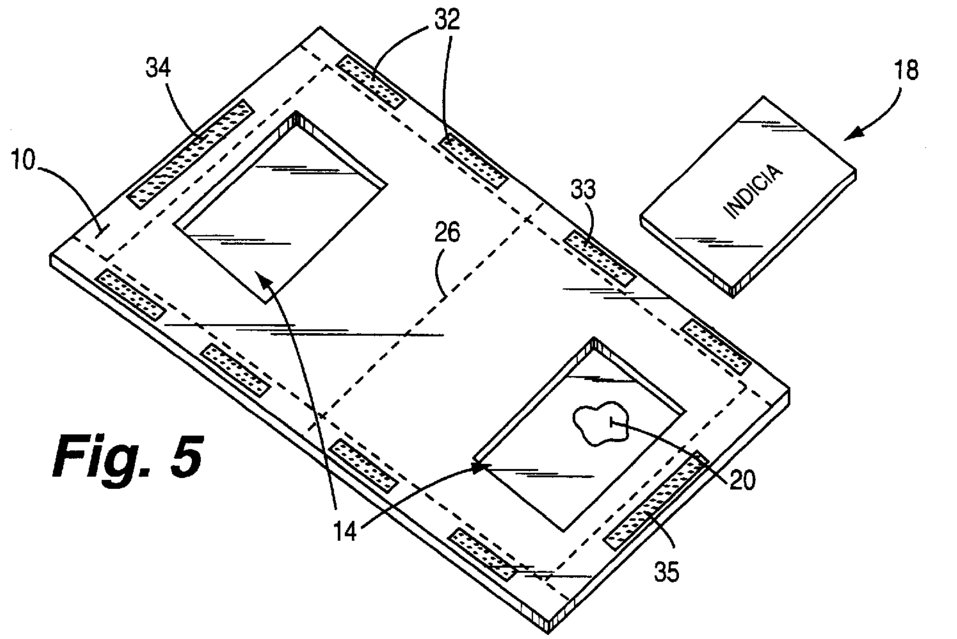
FIG. 5 is a view like that of FIG. 2 of another embodiment of an intermediate, with inserted card, according to the present invention.

After card application 19, and after imaging at 21 when utilized, the intermediate 10 is folded about one or more fold lines- such as the first fold line 26 seen in FIGS. 2 and 5- as indicated by box 27 in FIG. 1. The folding step 27 may be practiced utilizing any suitable conventional equipment for folding mailer type business forms.

Finally, the folded intermediate from step 27 is steam-roll sealed as illustrated at 28 in FIG. 1, using a conventional steam-roll sealer which is capable of, and applies, at least 100 pounds pressure for lineal inch (e.g. about 300 pounds pressure per lineal inch) to effect sealing of the pressure activated cohesive, to form the final mailer, such as schematically illustrated at 29 in FIG. 1. Of course, postage, or other delivery structures or characters, are applied to the mailer 29 on the same face thereof as the outgoing address 24.

The method of the invention may be practiced with the intermediate 10 in continuous web format, or cut sheet format.

The details of the intermediate 10 and card 18 that make the practice of the method of FIG. 1 possible are illustrated in the embodiments of FIGS. 2 through 6. In the embodiment of FIG. 2, the intermediate 10 and the card 18 have substantially the same thickness, or the card 18 has a lesser thickness. The patch 15 has a thickness that is less than one-fourth the thickness of the intermediate 10, and the card 18 may have a thickness less than that of the intermediate 10, or where the patch 15 has a particularly small thickness, the card 18 may have substantially the same thickness as the intermediate 10 and still be properly steam-roll sealed. In one embodiment according to the invention, the card 18 has a thickness of about 7 mils (counting the thickness of any layer of hot melt adhesive, or the like, if applied using the same) and the intermediate 10 is 38 pound ledger paper, which also has a thickness of about 7 mils, and the patch 15 (if used) has a thickness of about ½ mill.

The card 18 may be made of any suitable material, such as paper, paper with transparent plastic laminated to one or both faces thereof, plastic, or the like.

FIG. 2 schematically illustrates a plurality of patterns of pressure activated cohesive. For example, the patterns 30 cooperate with the patterns 31 when the intermediate 10 is folded about the fold line 26, while the patterns 32 cooperate with the patterns 33, and the pattern 34 cooperates with the pattern 35. The patterns 30–35 may be discontinuous strips, continuous strips, dots, or any other conventional shape or construction. The pressure activated adhesive used for the patterns 30–35 is preferably that sold commercially by Toppan Forms Company of Tokyo, Japan under the trade designation TN-124, and/or such as shown in U.S. Pat. Nos. 4,918,128, 5,190,818, 5,314,944 and 5,427,851.

The intermediate 10 may be constructed in any conventional manner so that it is folded as desired to provide a final mailer. For example, the intermediate 10 may be Z-folded (which is the case for the embodiment actually illustrated in FIGS. 2 and 3), or C-folded, or V-folded (which is the case for the embodiment of FIG. 4), or double V-folded, or eccentric Z or C-folded, etc., all as are conventional per se (e.g. see U.S. Pat. Nos. 5,201,464, 5,314,110, 5,253,798, 5,167,739, and 5,238,178). The cohesive patterns 30–35- as well as any other additional cohesive patterns- such as seen at 36 and 37 in FIGS. 2 and 3- are modified and provided for that purpose.

In the embodiment of FIGS. 2 and 3, the cutout 12 has length and width dimensions slightly greater than the length and width dimensions of the card 18 so that the card 18 is received therein (as seen in FIG. 3), the form is provided without a patch 15. Thus, depending upon the processing equipment it may be desirable to fold over the portion 17 of the intermediate 10, about the fold line 39, as indicated by the arrow 40 in FIG. 2, to form a bottom support for the card 18 while it is within the cutout 12 to insure that the card 18 is held in place during subsequent handling (such as imaging at 21 and/or folding at 27). That is, the first fold activity 16 (FIG. 1) may be practiced.

Note that the intermediate 10 has a first face 41 and a second face 42, which are seen in FIG. 2, and first length and width dimensions which are more than twice as great as the length and width dimensions of the card 18. Typical dimensions of most standard cards 18 are about 3⁵⁄₁₆ inches by 2⅛ inch, while the intermediate sheet of paper 10 typically has dimensions of 8½x11, 8½x14, or is A4 size.

The sheet 10 also has, as is conventional, longitudinal perforation lines, or other lines of weakness, 44 which allow the mailer 29 to be readily opened, and additional perforation lines 45 may also be provided associated with the strips 34, 35, 37 as is also conventional.

In the FIG. 4 embodiment, the mailer 129 is a V-folded version of the mailer 29 only including the patch 15, and without the Z-folded portion 17. The patch 15 may be of transparent or opaque material, and if of transparent material the card must be pre-printed. If there was a hole in the glassine, the laser printer could print the address in duplex mode.

Figure 6:
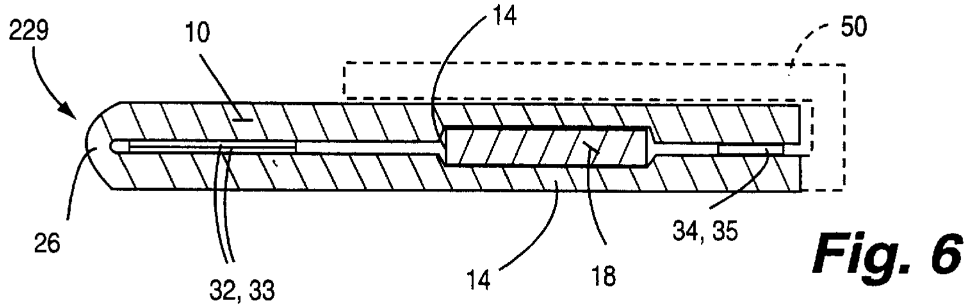
FIG. 6 is a view like that of FIG. 3 of the intermediate and card of FIG. 5 folded into a sealed mailer.

In the intermediate in FIGS. 5 and 6, components comparable to those in the FIGS. 2 through 4 embodiment are shown by the same reference numeral.

The most significant difference between FIGS. 5 and 6 and the FIGS. 2 through 4 embodiments is the provision of the thinned portions 14 inserted of the cutout 12. Where the portions 14 are thinned so that the thickness of the sheet 10 thereat is about half of what it normally is (as can be seen in FIG. 6), then the card 18 of the same thickness as the sheet 10 may be received thereby, as seen in FIG. 6, while the entire mailer 229 is of substantially uniform thickness, so that it may be steam-roll sealed at 28. In the FIGS. 5 and 6 embodiment the card 18 is shown with the same thickness as the sheet 10 and with the thinned portions 14 thinned to one-half the normal thickness, but if the portions 14 cannot be thinned to one-half the normal thickness, then the card 18 may be slightly thinner than the sheet 10.

It is also possible to construct the embodiments of mailers according to the invention where the card is thicker than the sheet of paper forming the intermediate. Two such embodiments are illustrated schematically in FIGS. 7 and 8. In the FIGS. 7 and 8 embodiments components comparable to those in the FIGS. 2 through 6 embodiments are shown by the same reference numeral only preceded by a "3".

Figure 7:
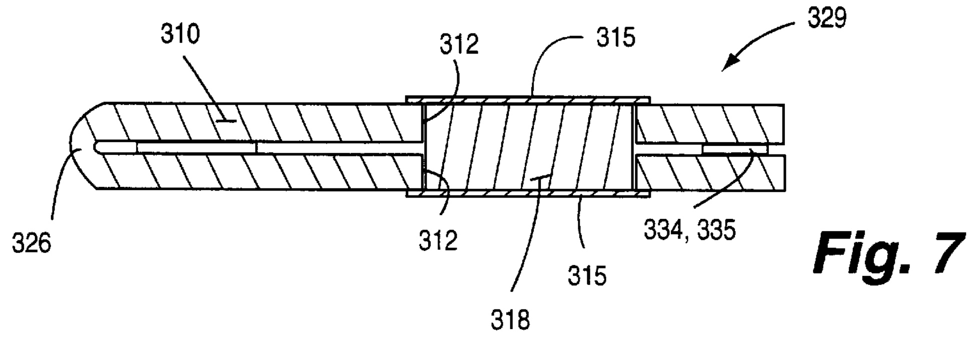
FIGS. 7 and 8 are schematic cross-sectional views of yet two other embodiments of sealed mailers according to the invention.

In the FIG. 7 embodiment, the sheet of paper 310 has a thickness that is only about half that of the card 318, and two die cutouts 312, which cooperate with each other when the sheet of paper 310 is folded about the fold lie 326, are provided in cooperating portions of the sheet 310 as seen in FIG. 7, to produce the mailer 329. Patches 315 cover both ends of the cutouts 312. As best seen in the FIG. 7 embodiment the thickness of the card 318 plus the thicknesses of the windows 315 (which may be very thin) are approximately equal to twice the thickness of the sheet of paper 310.

Figure 8:
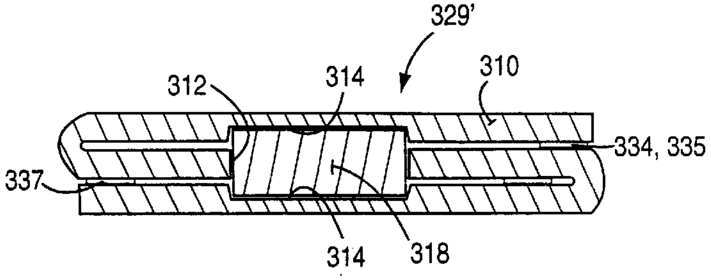

In FIG. 8, the mailer 329' is Z-folded, and includes a central panel formed from the paper 310 having a cutout 312 therein for receipt of the card 318, while the top and the bottom panels have depressions 314 formed therein. The thicknesses of the thinned portions 314 plus the thickness of the card 318 is substantially equal to three times the thickness of the sheet 310 in the FIG. 8 embodiment.

A C-fold mailer, or eccentric C-fold mailer, may be provided by utilizing the extra flap of the mailer, as indicated schematically in dotted line at 50 in FIG. 6.

It will thus be seen that according to the present invention a method of forming a mailer type business form having pressure activated cohesive, and business form intermediates and mailers utilized therein and produced thereby, have been provided which allow sealing utilizing a steam-roll sealer despite the inclusion of an insert (card) therein. While the invention has been herein shown and described in what is presently conceived to be the most practical preferred embodiment thereof, it will be apparent to those of ordinary skill in the art that many modifications may be made thereof within the scope of the invention, which scope is to be accorded the broadest interpretation of the appended claims so as encompass all equivalent structures and methods.

What is claimed is:

1. A method of forming a mailer from an intermediate having a plurality of pressure activated cohesive cooperating patterns and a first thickness, and a card having a second thickness substantially the same as or less than the first thickness, comprising:

(a) forming a surface manifestation in at least one portion of the intermediate having length and width dimensions at least as great as length and width dimensions of the card;

(b) placing the card in operative association with the surface manifestation;

(c) folding the intermediate to form an unsealed mailer with the pressure activated cohesive patterns in operative association with each other; and (d) steam-roll sealing the unsealed mailer to cause the pressure activated cohesive patterns to seal, to form a final mailer.

2. A method as recited in claim 1 wherein (a) is practiced by forming a cutout as the surface manifestation.

3. A method as recited in claim 2 further comprising placing a patch having a thickness less than one fourth the thickness of the intermediate over the cutout to prevent the card from passing through the cutout during subsequent handling.

4. A method as recited in claim 2 further comprising forming a first fold in the intermediate covering the cutout to prevent the card from passing through the cutout during subsequent handling.

5. A method as recited in claim 2 further comprising imaging at least one of the card and the intermediate after (b) and before (c).

6. A method as recited in claim 1 wherein (a) is practiced by reducing the thickness of the intermediate at two portions thereof that are aligned with each other after the practice of (c), and wherein (b) is practiced by placing the card in contact with one of the reduced thickness portions.

7. A method as recited in claim 6 wherein (a) is practiced by embossing the intermediate to form the reduced thickness portions.

8. A method as recited in claim 6 further comprising imaging at least one of the card and the intermediate after (b) and before (c).

9. A method as recited in claim 2 wherein (a)–(d) are practiced using a card having substantially the same thickness as the intermediate.

10. A method as recited in claim 1 wherein (a)–(d) are practiced using a card about 7 mil thick and 38 pound ledger paper as the intermediate.

11. A method as recited in claim 6 wherein (a)–(d) are practiced using a card having substantially the same thickness as the intermediate.

12. A method of forming a mailer from an intermediate having a plurality of pressure activated cohesive cooperating patterns and a first thickness, and a card having a second thickness greater than the first thickness, comprising:

(a) forming a surface manifestation in at least two portions of the intermediate having length and width dimensions at least as great as length and width dimensions of the card;

(b) placing the card in operative association with at least one of the surface manifestations;

(c) folding the intermediate to form an unsealed mailer with the pressure activated cohesive patterns in operative association with each other and so that the card is in operative association with the at least two portions; and (d) steam-roll sealing the unsealed mailer to cause the pressure activated cohesive patterns to seal, to form a final mailer.

13. A method as recited in claim 12 wherein two surface manifestations are provided, and wherein (a) is practiced by forming a cutout as each of the surface manifestations.

14. A method as recited in claim 13 further comprising placing a patch having a thickness less than one fourth the thickness of the intermediate over each of the cutouts to prevent the card from passing through the cutouts during subsequent handling.

15. A method as recited in claim 13 further comprising forming first and second folds in the intermediate covering the cutouts to prevent the card from passing through the cutouts during subsequent handling.

16. A method as recited in claim 12 wherein (a) is practiced to form a cutout in one portion of the intermediate and at least one reduced thickness portion in another portion of the intermediate.

17. A method as recited in claim 16 wherein (a) further comprises forming first and second reduced thickness portions in the intermediate at two different portions thereof, and wherein (c) is practiced to align the cutout and two reduced thickness portions.

18. A method as recited in claim 16 wherein (a) is practiced to form the at least one reduced thickness portion by embossing the intermediate.

19. A method as recited in claim 16 wherein (d) is practiced to apply a force of at least 100 pounds/lineal inch.

20. A method as recited in claim 1 wherein (d) is practiced to apply a force of at least 100 pounds/lineal inch.

* * * * *